United States Patent
Boylan

(10) Patent No.: US 7,501,471 B2
(45) Date of Patent: Mar. 10, 2009

(54) WATERBORNE HYDROPHOBIC BARRIER COATINGS

(75) Inventor: John Richard Boylan, Bethlehem, PA (US)

(73) Assignee: Wacker ChemicalCorporation, Adrian, MI (US)

(*) Notice: Subject to any disclaimer, the term of this patent is extended or adjusted under 35 U.S.C. 154(b) by 0 days.

(21) Appl. No.: 11/338,296

(22) Filed: Jan. 24, 2006

(65) Prior Publication Data

US 2006/0122313 A1 Jun. 8, 2006

Related U.S. Application Data

(63) Continuation-in-part of application No. 10/434,836, filed on May 9, 2003, now abandoned, which is a continuation-in-part of application No. 10/155,760, filed on May 24, 2002, now abandoned.

(51) Int. Cl.
*C08L 31/04* (2006.01)
*C08L 91/08* (2006.01)

(52) U.S. Cl. ............... 524/563; 524/475; 524/477; 524/487

(58) Field of Classification Search .......... 524/475, 524/477, 487, 563
See application file for complete search history.

(56) References Cited

U.S. PATENT DOCUMENTS

| | | | |
|---|---|---|---|
| 2,424,831 A | 7/1947 | Klaber | |
| 3,394,097 A | 7/1968 | Bissot | |
| 3,440,199 A * | 4/1969 | Volpe et al. | 523/410 |
| 3,775,147 A * | 11/1973 | Ferm | 106/271 |
| 3,839,141 A | 10/1974 | McKinnon | |
| 3,912,674 A | 10/1975 | Stahl | |
| 4,062,818 A | 12/1977 | Mate | |
| 4,164,489 A | 8/1979 | Daniels et al. | |
| 4,303,456 A | 12/1981 | Schmuck et al. | |
| 4,521,561 A | 6/1985 | Hausman et al. | |
| 4,921,898 A | 5/1990 | Lenney et al. | |
| 4,987,632 A | 1/1991 | Rowe et al. | |
| 5,545,459 A | 8/1996 | Chang | |
| 5,837,089 A | 11/1998 | Magrum | |
| 5,856,246 A | 1/1999 | Witzko et al. | |
| 6,251,210 B1 | 6/2001 | Bullock et al. | |
| 6,808,793 B2 | 10/2004 | Randall et al. | |
| 2001/0021616 A1 | 9/2001 | Bullock et al. | |
| 2002/0013560 A1 | 1/2002 | Erspamer et al. | |

FOREIGN PATENT DOCUMENTS

| | | |
|---|---|---|
| GB | 876 226 | 8/1961 |
| GB | 1 260 477 | 1/1972 |
| GB | 1 308 045 | 2/1973 |
| WO | WO 98/14078 | 4/1998 |
| WO | WO 03/039852 A1 | 5/2003 |

OTHER PUBLICATIONS

Bricker, M., Pitture e Vernici Europe (1996), 72(14), 36-41.*
Richard Knowlson, "Airlaid Products—Investment In the Future", *Nonwovens Industry*, Oct. 2001, pp. 34-36.
Colbert, "Fluorochemicals—fluid repellency for nonwoven substrates", *TAPPI*, Sep. 1976, vol. 59, No. 9, pp. 129-131.
"Water vapor transmission rate of sheet materials at standard temperature and humidity", *TAPPI*, T 488 om-89, pp. 1-3, 1989.
"Modified EDANA Hydrostatic Head Test", Mar. 93.

* cited by examiner

*Primary Examiner*—Helen L. Pezzuto
(74) *Attorney, Agent, or Firm*—Brooks Kushman P.C.

(57) ABSTRACT

A waterborne hydrophobic barrier coating formulation comprising a blend of a vinyl acetate-ethylene (VAE) polymer emulsion and a paraffin wax emulsion, wherein a dried coating of the blend on a substrate, such as a nonwoven web, an absorbent pad, or a textile, and dried, has a hydrostatic head barrier sufficient to prevent passage of fluids but allow passage of water vapor through it. A multi-layer material comprising at least one layer of a nonwoven web, an absorbent pad, or a textile, and at least one layer of a blend of a VAE polymer emulsion and paraffin wax emulsion.

7 Claims, No Drawings

WATERBORNE HYDROPHOBIC BARRIER COATINGS

CROSS REFERENCE TO RELATED APPLICATIONS

This is a continuation-in-part of patent application Ser. No. 10/434,836, filed on May 9, 2003, now abandoned which is a continuation-in-part of patent application Ser. No. 10/155,760 filed on May 24, 2002, abandoned.

BACKGROUND OF THE INVENTION

Barrier coatings and barrier layers are used in a variety of applications; for example absorbent materials, nonwovens, and textiles. They are particularly important in absorbent materials for such products as absorbent pads, medical hygiene products, food bibs, food packaging, table top covers and the like where a hydrophobic layer covers but does not interfere with the absorbent material. The barrier layer prevents the absorbed fluid from penetrating through the side opposite from where fluid was absorbed. When coatings are used on these types of products, it is desirable that they have little or no formaldehyde and no alkylphenol ethoxylate surfactants.

Absorbent materials are frequently multi-layered in construction and can comprise a liquid-permeable cover sheet having one side designed for placement in contact with the wearer or food, an absorbent section, and an impervious backsheet. Polyethylene films are typically used as a backsheet for absorbent pads because it prevents passage of fluids to the opposite side of the film. In some cases, the polyethylene film is perforated in such a way as to allow water vapor to pass through the film but inhibit the passage of fluids. However, there are drawbacks to the use of polyethylene film for absorbent pads. For example, it is sometimes difficult to place and attach the polyethylene film to a substrate, creating waste when it skews off the substrate during secondary operations. In some cases, application of an adhesive, such as a hot melt adhesive, or some other method of attachment is needed to keep the polyethylene film in place. Also, the polyethylene film needs to be applied in a secondary operation which is separate from the production of the absorbent pad, textile, or nonwoven. A more practical substitute for the polyethylene backsheet would therefore benefit the industry.

Examples of coatings used as water repellents are disclosed in the following publications:

Colbert ("Fluorochemicals—fluid repellency for nonwoven substrates" (TAPPI, September 1976, Vol. 59, No. 9, pages 129-131)) discloses the use of fluorochemicals to provide fluid repellency to nonwoven substrates without the formation of continuous film barriers.

U.S. Pat. No. 4,062,818 (Mate, 1977) discloses an aqueous composition which imparts both flame resistance and water repellency properties to nonwoven textiles. The composition contains a poly(vinyl acetate), a chloro- or bromo-substituted phosphate plasticizer, a polyfluoroalkyl polyacrylate, water repellent, and an inorganic, water soluble salt.

U.S. Pat. No. 3,912,674 (Stahl, 1975) discloses a water repellent coating made up of an ethylene ionic copolymer, a paraffin wax, and a terpolymer of vinyl acetate, ethylene, and N-methylol acrylamide. The ethylene copolymer dispersion is held in dispersed phase by means of an amine soap surfactant.

WO98/14078 (Baumann, et al., 1998) discloses a face mask that allows gas to pass through while inhibiting passage of liquid through it. The mask includes a face-contacting layer, an outer cover layer, a polymeric microfiber mat disposed between the face-contacting layer and the outer cover sheet, and a non-woven fibrous mat disposed between the face-contacting layer and the outer cover sheet. The non-woven fibrous mat includes polymeric fibers and a surface energy reducing agent, such as a fluorochemical, a wax, a silicon or a combination thereof.

US 2001/0021616 A1 and U.S. Pat. No. 6,251,210 B1 (Bullock et al, 2001) disclose a method of preparing a stain resistant and water repellant textile fabric in which the fabric is first treated with a fluorochemical textile treatment composition and dried at elevated temperature. The treated fabric is then provided with a polymeric film to one side of the treated fabric and dried again at elevated temperature. A detackifying wax may be part of the secondary treatment composition.

BRIEF SUMMARY OF THE INVENTION

This invention is directed to a coating formulation comprising a blend of a vinyl acetate-ethylene (VAE) polymer emulsion and a paraffin wax emulsion. The coating formulation, when applied to a substrate, such as an absorbent or nonwoven material, and dried, has a hydrostatic head barrier sufficient to prevent passage of fluids but allow passage of water vapor through it. The term "fluids" used herein refers to liquids, especially aqueous-based liquids. The coating can be used to replace the backsheet in absorbent products, such as personal hygiene products, medical hygiene products, such as bed pads and nonwoven medical garments, and absorbent pads for food packaging. Other nonwoven products to which the coating can be applied include roofing substrates and housewrap where water barrier properties are required; however passage of water vapor is also required. The coating can also be used in other applications, such as textile fabrics, that require a water barrier to prevent penetration of water or other fluids but allow the escape of water vapor. This invention is also directed to a multi-layer material and a method of making the multi-layer material, wherein the multi-layer material comprises at least one layer of a nonwoven web, an absorbent pad, a textile fabric, or a nonwoven textile, and at least one layer of a blend of a VAE polymer emulsion and a paraffin wax emulsion. The blend, after drying, has a hydrostatic head barrier sufficient to prevent passage of fluids through it but allow passage of water vapor. The blend can be applied to one or more of the nonwoven web, absorbent pad, textile fabric, or nonwoven textile that makes up the multi-layer material.

One embodiment of this invention is a blend comprising a VAE polymer emulsion, a paraffin wax emulsion, and, optionally, other components, which, when applied on a substrate and dried, has a hydrostatic head barrier sufficient to prevent passage of fluids through it but allow passage of water vapor.

Another embodiment of this invention is a blend comprising a poly(vinyl alcohol)-stabilized VAE polymer emulsion and a paraffin wax emulsion which, when applied on a substrate and dried, has a hydrostatic head barrier sufficient to prevent passage of fluids through it but allow passage of water vapor.

Yet another embodiment of this invention is a multi-layer material comprising:

(a) at least one layer of a substrate, such as a nonwoven web, an absorbent pad, a textile fabric, or a nonwoven textile; and (b) at least one layer of a coating formulation comprising a blend of a VAE polymer emulsion and a paraffin wax emulsion;

said coating formulation, after drying, having a hydrostatic head barrier sufficient to prevent passage of fluids through it, but allow passage of water vapor.

Another embodiment of this invention is a method for making a multi-layer material which has a hydrostatic head barrier sufficient to prevent passage of fluids through it, but allow passage of water vapor, comprising:
  (a) providing a substrate, such as a nonwoven web, an absorbent pad, a textile fabric, or a nonwoven textile;
  (b) providing a coating formulation comprising a blend of a VAE polymer emulsion and a paraffin wax emulsion.
  (c) applying the coating formulation blend onto the substrate; and
  (d) drying the coating formulation.

Some of the advantages of the coating formulation of this invention are:
  the coating formulation can comprise polymer emulsions that are free of alkylphenol ethoxylate surfactant and have little or no formaldehyde, making them suitable for use on absorbent pads, nonwovens, textiles, or the like, having food or human skin contact;
  the coating formulation can be applied directly to a substrate, eliminating the need for a separate backsheet; and
  the coating formulation attaches directly to a substrate, eliminating the need for an additional procedure to attach a backsheet.

DETAILED DESCRIPTION OF THE INVENTION

The coating formulation of this invention comprises a VAE polymer emulsion blended with a paraffin wax emulsion, and optionally a separate protective colloid, such as hydroxyethyl cellulose or poly(vinyl alcohol) (PVOH). The blend comprises 10 to 90 wt % VAE polymer emulsion, and 10 to 90 wt % paraffin wax emulsion, based on the total weight of the blend.

The polymer emulsion can be a VAE polymer emulsion comprising a polymer of vinyl acetate and ethylene, and optionally one or more other ethylenically unsaturated monomer. Exemplary of other ethylenically unsaturated monomers are $C_3$-$C_{10}$ alkenoic and alkenedioic acids, such has acrylic acid, crotonic acid, maleic acid, fumaric acid, and itaconic acid, and their mono- and diesters with $C_1$-$C_{18}$ alkanols, such as methanol, ethanol, propanol, butanol, and 2-ethylhexanol; vinyl halides, such as vinyl chloride; and nitrogen containing monomers, such as nitriles, amides, N-methylol amides, lower alkanoic acid esters of N-methylol amides, lower alkyl ethers of N-methylol amides and allylcarbamates, such as acrylonitrile, acrylamide; and lower alkyl ethers and lower alkanoic acid esters of N-methylol acrylamide and N-methylol allylcarbamate.

Vinyl acetate in the VAE polymer typically ranges from 70 to 95 wt %, and ethylene ranges from 5 to 30 wt %, based on the total monomers in the copolymer. Up to 10 wt % of other ethylenically unsaturated monomers may be present in the copolymer. The combination of monomers in the VAE polymer is such that the polymer has a $T_g$ of −15 to 30° C.; preferably 10 to 25° C. Examples of VAE polymers which are appropriate for this invention contain 80 to 95 wt % vinyl acetate and 5 to 20 wt % ethylene. The VAE polymers can also contain 85 to 95 wt % vinyl acetate and 5 to 15 wt % ethylene, or 90 to 95 wt % vinyl acetate and 5 to 20 wt % ethylene.

The VAE polymer emulsion can be formed by copolymerization of the monomers in the presence of a stabilizing system by aqueous emulsion polymerization techniques well known in the art. Examples of known methods of forming VAE polymer emulsions are disclosed in U.S. Pat. Nos. 4,164,489; 4,521,561; and 4,921,898; which are hereby incorporated by reference. AIRFLEX® RB-18 VAE polymer emulsion, available form Air Products and Chemicals, Inc., is an example of a commercial VAE polymer emulsion that can be used in this invention.

The stabilizing system used in making poly(vinyl acetate) or VAE polymer emulsions can comprise surfactants, emulsifiers, a protective colloid, or a combination of surfactants, emulsifiers, and protective colloid. Poly(vinyl alcohol) is a preferred protective colloid.

VAE polymer emulsions that can be particularly effective in the coating formulation of this invention are PVOH-stabilized polymer emulsions having a $T_g$ ranging from −15 to 30° C.; preferably 10 to 25° C. A coating formulation that has little (less than about 50 ppm) or no formaldehyde and is free of alkylphenol ethoxylate surfactants can be especially useful for absorbent pads that are in contact with food, and for personal and protective hygiene products.

Typical paraffin waxes have melt point temperatures of 114 to 160° F. (46 to 71° C.). Solids of the final paraffin wax emulsion can vary from 25% to 60%; more typically, 35 to 55%. The pH of the emulsion can range from 8 to 10, typically 8.9 to 9.8, but is dependent on the process used. The final particle size is dependent on a number of variables including the homogenization which is used at the end of the process. Particle size of the paraffin wax emulsion can vary between 0.02 to 1.5 microns. The particle size for paraffin wax alone is typically 0.2 to 0.8 microns; preferably 0.3 microns or greater or 0.4 microns or greater. The final average particle size of the paraffin wax emulsion has been found to be important to the viscosity of the blend in which the polymer emulsion is a poly(vinyl alcohol) stabilized VAE polymer emulsion. In a blend of a poly(vinyl alcohol) stabilized VAE polymer emulsion, if the average particle size of the paraffin wax is less than 0.3 micron, an undesirable rise in viscosity of the blend can occur during the blending process. An average particle size of at least 0.3 micron, preferably at least 0.4 micron is desired for blends containing poly(vinyl alcohol) stabilized VAE polymer emulsions.

The paraffin wax emulsion can also be a blend of paraffin wax with other materials, such as polyethylene or ethylene acrylic acid. Emulsion blends of paraffin wax and polyethylene or paraffin wax and ethylene acrylic acid are commercially available from Michelman Inc under the product name Michem emulsion 62330 and Michem emulsion 34935, respectively.

The paraffin wax emulsion can be prepared by melting refined paraffin wax to a temperature above the melting point of the paraffin. Appropriate emulsifiers, such as stearic acid, oleic acid, diethylamine ethanol, 2-amino-2-methyl-1-propanol, can then be stirred into the wax emulsion at the elevated temperature. A base, such as potassium hydroxide or ammonium hydroxide, can then be dissolved in ethylene glycol or water at elevated temperatures and slowly added to the wax blend while increasing agitation speed of the mixer. After all the water/base mixture has been added to the molten wax, the resulting wax in water emulsion can be passed through a homogenizer to further adjust particle size of the emulsion. After homogenization, the resulting emulsion is cooled, for example, through a heat exchanger, and then filtered and packaged. Michem ME 70950, supplied by Michelman Inc, is an example of a commercially available paraffin wax emulsion that can be used in the blend of this invention.

The blend can contain other components such as pigments which may improve opacity or color; water soluble polymers or protective colloids, such as poly(vinyl alcohol) and hydroxyethyl cellulose, which may improve fiber bonding and aid in emulsion stability; and hydrophobic additives, such as fluoro surfactants, which may improve the hydrophobic character of the coating. Examples of fluoro surfactants are the perfluoroalkyl acrylic copolymers sold under the tradename Zonyl 8300 or Zonyl 7040, supplied by Ciba Geigy.

Representative blends are described in the following table:

| Component | Broad % dry wt (solids) | Preferred % dry wt (solids) | Most Preferred % dry wt (solids) |
|---|---|---|---|
| Polymer Emulsion | 10-90 | 20-80 | 40-60 |
| Paraffin Wax Emulsion | 10-90 | 20-80 | 40-60 |
| Water Soluble Polymer or Protective Colloid | 0-80 | 0-10 | 0-5 |
| Fluoro Surfactant | 0-5 | 0-3 | 0-2 |
| Pigment | 0-10 | 0-5 | 0-3 |
| Total | 100 | 100 | 100 |

Representative properties of the blends are summarized in the following table:

| Property | Broad Range | Preferred Range |
|---|---|---|
| Dry Solids | 25-60% | 35-55% |
| Viscosity (cps)* | 150 to 1200 | 200-1000 |
| pH | 8-10 | 8.9-9.8 |

*Measured with Brookfield Viscometer, Model RV @ 60 rpm; #3 spindle; 20° C.

The polymer emulsion and the paraffin wax emulsion can be blended together by well known methods, such as the following method:
 Add an appropriate amount of polymer emulsion to a blending vessel;
 Mix in a correct amount of dilution water to form the targeted solids;
 Adjust pH, under agitation, with ammonium hydroxide;
 Under agitation, slowly add the appropriate amount of paraffin wax emulsion;
 Optionally add, under agitation, other components; and
 Continue agitation until ingredients are well blended.

An example of a substrate to which the coating formulation is applied is a nonwoven fiber web in a single layer or multiple layers. The nonwoven web can be 100% cellulosic web, a blend of synthetic fibers and cellulosic fibers, or all synthetic fibers, such as polyethylene, polypropylene, polyester, and polyamide fibers. The webs can be formed by a dry process, such as air-laid, carded, and rando, or by a wet process. A 100% synthetic web can also be produced through a spun laid or melt blown process or made by a combination of processes. Examples of other substrates include textiles that require a hydrophobic coating that prevents penetration of fluids but allows transmission of water vapor; such as, disposable protective work garments, medical garments, and tablecloths.

The coating formulations of this invention can be applied as a coating to a substrate using well know coating techniques; for example, spraying, saturation, foam application, print application, and roll application. Coat weights typically range from 5 to 30 g/m² of substrate.

Hydrostatic barrier properties are measured in order to determine the effectiveness of the coating in preventing penetration of fluids through the coating. Hydrostatic barrier properties can be measured according to European Disposables and Nonwovens Association (EDANA) Test Method ERT.120.1-80, Repellency/Wet Barrier Hydrostatic Head Test. When the blend of this invention is applied as a coating to a substrate and dried, the coated substrate will exhibit a hydrostatic head barrier of at least 30 mm, preferably at least 60 mm, using EDANA Test Method ERT.120.1-80, in order to be effective as a barrier coating.

The invention will be further clarified by a consideration of the following examples, which are intended to be purely exemplary of the use of the invention.

In all examples, blends were made as described above. The paraffin wax emulsion was Michem ME 70950 supplied by Michelman Inc. The coating was spray applied to the nonwoven substrates. After adjusting the dry solids level of the coating formulations to about 10 and 20% solids, they were sprayed under pressure onto a surface of a nonwoven substrate. The nonwoven substrates were either 100% cellulosic fibers or a structured nonwoven web made from a layer of a 100% cellulosic fibers and a layer of synthetic fibers. The coating was applied to the layer of synthetic fibers in the substrate containing the layer of cellulosic fibers and the layer of synthetic fibers. The coated substrate was then dried in an air oven at temperatures above the boiling point of water; typically 125-160° C. (257-320° F.). Hydrostatic barrier properties of the coated substrate were measured according to EDANA Test Method ERT.120.1-80.

EXAMPLE 1

Comparison of Surfactant-Protected, PVOH-Protected, and Surfactant and PVOH Protected Polymer Emulsions Various polymer emulsions were blended with paraffin wax emulsions for the coating formulations. The results of measuring hydrostatic barrier properties of the coated substrates are presented in Table 1.

TABLE 1

| Sample | Polymer Emulsion used In Coating Formulation | Formulation, % dry solids | Polymer Emulsion Tg ° C. | Coat weight on Cellulose Web, g/m² of substrate surface | Hydrostatic Head of Coated Cellulose Web, mm | Coat weight on Structured Web, g/m² of substrate surface | Hydrostatic Head of Coated Structured Web, mm |
|---|---|---|---|---|---|---|---|
| 1 | AIRFLEX ® 4500 Surfactant Protected Ethylene Vinyl Chloride (EVCl) | 55% EVCl; 45% Paraffin wax | 3 | 25.4 | 40 | N/A | N/A |
| 2 | AIRFLEX 192 Surfactant Protected VAE | 50% VAE; 50% Paraffin wax | 10 | 23.1 | 63 | 27.3 | 79 |
| 3 | AIRFLEX 100HS Surfactant Protected VAE | 45% VAE; 55% Paraffin wax | 7 | 16.8 | 71 | N/A | N/A |
| 4 | AIRFLEX 7200 | 50% VAE; | 0 | 22.6 | 98 | 26.6 | 159 |

TABLE 1-continued

| Sample | Polymer Emulsion used In Coating Formulation | Formulation, % dry solids | Polymer Emulsion Tg °C. | Coat weight on Cellulose Web, g/m² of substrate surface | Hydrostatic Head of Coated Cellulose Web, mm | Coat weight on Structured Web, g/m² of substrate surface | Hydrostatic Head of Coated Structured Web, mm |
|---|---|---|---|---|---|---|---|
|  | PVOH/Surfactant Protected VAE | 50% Paraffin wax |  |  |  |  |  |
| 5 | AIRFLEX RB-18 PVOH Protected VAE | 55% VAE; 45% Paraffin wax | 17 | 25.4 | 106 | 25.2 | 242 |

N/A = not measured

These data show that PVOH-protected VAE polymer emulsions combined with the paraffin wax emulsion (samples 4 and 5) provided the best performance as a barrier coating. The VAE polymer emulsion that is protected with both PVOH and surfactant (sample 4) demonstrated good hydrostatic barrier properties on the cellulose substrate but was not as efficient on the structured substrate compared to sample 5.

EXAMPLE 2

Effect of Varying the Ratio of PVOH-Protected VAE and Paraffin Wax Emulsion in the Blend The ratio of the PVOH-protected AIRFLEX RB 18 VAE polymer emulsion and paraffin wax emulsion was varied to determine the effect of paraffin wax on the hydrostatic head properties of the coating on a 100% cellulosic web. Results are presented in Table 2.

TABLE 2

| VAE/Paraffin Wax formulation, % dry solids | Coat Weight, g/m² | Hydrostatic Head Result, mm |
|---|---|---|
| 100% VAE 0% Paraffin wax | 13.7 | 5 |
| 60% VAE 40% Paraffin wax | 11.6 | 58 |
| 50% VAE 50% Paraffin wax | 12.0 | 73 |
| 40% VAE 60% Paraffin wax | 11.6 | 84 |
| 30% VAE 70% Paraffin wax | 12.0 | 93 |

The data show that increasing the paraffin wax level from 0 to 70% of dry solids improved the hydrostatic head barrier properties of the coated substrate.

EXAMPLE 3

Effect of Varying the Amount of Paraffin Wax Emulsion

Effect of varying the amount of paraffin wax emulsion with AIRFLEX RB-18 VAE polymer emulsion in the coating formulation was studied. Coatings were spray applied at a 12% solids level and dried at 270° F. (132° C.) for 3 minutes. The results of measuring hydrostatic barrier properties of the coated substrates are presented in Table 3 below.

TABLE 3

| VAE Polymer Emulsion to Paraffin Wax Emulsion Ratio, % dry Solids | Coating Weight on Cellulose Substrate, g/m² | Hydrostatic Head Results, Cellulose Substrate, mm | Coating Weight, Structured Substrate, g/m² | Hydrostatic head Result on Structured Substrate, mm |
|---|---|---|---|---|
| 100/0 | 8.5 | 0 | 24.5 | 1 |
| 80/20 | 8.0 | 4 | 21.3 | 110 |
| 60/40 | 11.2 | 76 | 25.9 | 160 |
| 40/60 | 10.1 | 87 | 24.8 | 154 |
| 20/80 | 10.0 | 97 | 25.5 | 159 |
| 0/100 | 10.5 | 80 | 24.9 | 115 |

The data show that hydrostatic head increases with increased levels of paraffin wax up to 40% paraffin wax and then remains relatively level or declines.

EXAMPLE 4

Effect of Paraffin Wax Particle Size and Composition on Hydrostatic Barrier Head A paraffin wax/polyethylene emulsion blend having a particle size of 0.035 microns was compared to the Michem ME 70950 paraffin wax emulsion having a particle size of 0.35 microns. Both were combined with AIRFLEX RB-18 VAE polymer emulsion. The results of measuring hydrostatic barrier properties of the coated substrates are presented in Table 4 below.

TABLE 4

| VAE polymer emulsion/ Paraffin Wax emulsion formulation, % dry solids | Coat Weight, g/m² | Hydrostatic Head Result, mm |
|---|---|---|
| 55% PVOH protected VAE 45% Paraffin/polyethylene wax | 28.0 | 62 |
| 55% PVOH Protected VAE 45% Paraffin wax | 25.4 | 106 |

The data show that although both formulations provide good hydrostatic head barrier properties, the formulation containing paraffin wax emulsion alone was more effective than the paraffin wax/polyethylene wax combination.

EXAMPLE 5

Water Vapor Transmission Rate on Nonwoven Substrate Coated With PVOH Protected VAE and Paraffin Wax Emulsion Blend The water vapor transmission rate of a 100% cellulose nonwoven substrate coated with a blend of AIRFLEX RB-18

VAE polymer emulsion and paraffin wax emulsion was compared to the nonwoven substrate without the coating. The test followed TAPPI method (Technical Association of the Pulp and Paper Industry) T 448 entitled, "Water vapor transmission rate of sheets at standard temperatures and humidity." The result of water loss or moisture vapor loss through the nonwoven substrates is shown in the table below:

TABLE 5

|  | Coat Weight g/m$^2$ | Water Loss Rate g/m$^2$/24 hours |
|---|---|---|
| Coated Substrate | 21.1 | 647.4 |
| Base Sheet | 0 | 634.6 |

These results show that the coating did not hinder the moisture vapor rate of the nonwoven substrate.

What is claimed is:

1. A blend comprising a poly(vinyl alcohol) stabilized vinyl acetate-ethylene polymer emulsion and a paraffin wax emulsion, wherein a dried coating of said blend on a substrate has a hydrostatic head barrier sufficient to prevent passage of fluids but allow passage of water vapor through it, the vinyl acetate-ethylene polymer emulsion comprises a polymer containing 70 to 95 wt % vinyl acetate and 5 to 30 wt % ethylene, based on the total weight of monomers in the polymer, and the paraffin wax in the paraffin wax emulsion has an average particle size of at least 0.3 microns.

2. The blend of claim 1 wherein the hydrostatic head barrier is at least 60 mm.

3. The blend of claim 2 wherein the vinyl acetate-ethylene polymer has a $T_g$ of 10 to 25° C.

4. The blend of claim 2 wherein the vinyl acetate-ethylene polymer emulsion has little or no formaldehyde and is free of alkylphenol ethoxylate surfactants.

5. The blend of claim 2 wherein the paraffin wax emulsion further comprises polyethylene or ethylene acrylic acid.

6. The blend of claim 2 comprising, on a 100% dry weight solids basis:

| 20-80% | vinyl acetate-ethylene polymer emulsion |
|---|---|
| 20-80% | paraffin wax emulsion |
| 0-10% | water soluble polymer or a protective colloid |
| 0-3% | fluoro surfactant |
| 0-5% | pigment. |

7. The blend of claim 2 comprising, on a 100% dry weight solids basis:

| 40-60% | vinyl acetate-ethylene polymer emulsion |
|---|---|
| 40-60% | paraffin wax emulsion |
| 0-5% | water soluble polymer or a protective colloid |
| 0-2% | fluoro surfactant |
| 0-3% | pigment. |

* * * * *